United States Patent
Okamoto

(10) Patent No.: US 6,896,991 B2
(45) Date of Patent: May 24, 2005

(54) SOLID POLYMER ELECTROLYTE FUEL CELL AND METHOD FOR PRODUCING ELECTRODE THEREOF

(75) Inventor: Hikaru Okamoto, Hekinan (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 399 days.

(21) Appl. No.: 09/990,378

(22) Filed: Nov. 23, 2001

(65) Prior Publication Data

US 2002/0090543 A1 Jul. 11, 2002

(30) Foreign Application Priority Data

Nov. 22, 2000 (JP) ........................................ 2000-355722

(51) Int. Cl.[7] .............................................. H01M 8/00
(52) U.S. Cl. .............................. 429/40; 429/41; 429/42
(58) Field of Search ............................. 429/40, 41, 42, 429/43, 44, 45, 46, 34, 38–39, 30

(56) References Cited

U.S. PATENT DOCUMENTS

| 5,998,057 | A | * | 12/1999 | Koschany et al. ............ 429/42 |
| 6,350,539 | B1 | * | 2/2002 | Wood et al. .................. 429/34 |
| 6,605,381 | B1 | * | 8/2003 | Rosenmayer ................. 429/39 |
| 2001/0044373 | A1 | * | 11/2001 | Lott et al. .................... 502/101 |
| 2003/0068544 | A1 | * | 4/2003 | Cisar et al. ................... 429/40 |

FOREIGN PATENT DOCUMENTS

| JP | 10-261421 | 9/1998 |
| JP | 2000-136493 | 5/2000 |

* cited by examiner

*Primary Examiner*—Michael Barr
*Assistant Examiner*—Monique Wills
(74) *Attorney, Agent, or Firm*—Oblon, Spivak, McClelland, Maier & Neustadt, P.C.

(57) ABSTRACT

A solid polymer electrolyte fuel cell includes a polymer electrolyte membrane having proton-conductivity. An anode is disposed on one surface of the polymer electrolyte membrane, and a cathode is disposed on the other surface of the polymer electrolyte membrane. The cathode has a first gas diffusion layer joined to a second gas diffusion layer in the thickness direction of the cathode. The second gas diffusion layer has different characteristic compared to the first gas diffusion layer.

8 Claims, 3 Drawing Sheets

SOLID POLYMER ELECTROLYTE FUEL CELL AND METHOD FOR PRODUCING ELECTRODE THEREOF

CROSS-REFERENCE TO RELATED APPLICATIONS

This application is based on and claims priority under 35 U.S.C. §119 with respect to Japanese Patent Application No. 2000-355722 filed on Nov. 22, 2000, the entire content of which is incorporated herein by reference.

BACKGROUND OF THE INVENTION

1. Field of the Invention

This invention relates to a solid polymer electrolyte fuel cell and a method for producing an electrode of the polymer electrolyte.

2. Discussion of the Background

Conventional solid polymer electrolyte fuel cells include a proton-conductive solid polymer electrolyte membrane. Solid polymer electrolyte fuel cells generate electromotive force by electrochemical reactions between fuel gas (for example, $H_2$ gas) and oxidizer gas.

The solid polymer electrolyte fuel cells produce the following electrochemical reaction between $H_2$ gas as the fuel gas and the oxidizer gas as the $O_2$ gas at an anode side.

$$2H_2 \rightarrow 4H^+ + 4e^- \quad (1)$$

After the electrochemical reaction, the resulting proton (H+) passes through the solid polymer electrolyte membrane. Then the solid polymer electrolyte fuel cell produces the next reaction at a cathode.

$$4H^+ + O_2 + 4e^- \rightarrow 2H_2O \quad (2)$$

Accordingly, the electrolyte fuel cell produces an electromotive force between the anode and cathodes of up to 1.23 V.

The schematic drawing of the conventional solid polymer electrolyte fuel cell is shown in FIG. 3. To smoothly and efficiently produce the above electrochemical reactions of the fuel cell shown in the reaction formulas 1 and 2, gas diffusion electrode 1b in FIG. 3 plays a very important role.

For the solid polymer electrolyte fuel cell to generate electric power, each of the fuel gas and the oxidizer gas needs to be supplied to surfaces of catalytic layers 1d disposed on the electrodes. At the cathode, water is generated on the surface of the catalytic layer 1d, as shown in the reaction formula (2). This water covers the surface of the catalytic layer 1d to inhibit the oxidizer gas from being supplied to the catalytic surface 1d.

In the anode 1bb protons (H+) generated by the reaction as shown in the reaction formula (1) hydrate or take the water to the cathode 1ba through the solid polymer electrolyte membrane 1a. But the water in the anode 1bb is absorbed and stops short. Therefore the solid polymer electrolyte membrane 1a becomes dried out. To prevent the catalytic layer 1d from being dried, the fuel gas supplied to the catalytic layer 1d at the anode 1bb is generally humidified. But the excessive humidification by the fuel gas inhibits the fuel gas from being supplied to the catalytic surface 1d at the anode. To avoid the flooding due to water generated by the reactions and the water added by the humidified fuel gas, the electrode has been mixed with a water-repellent 1c, i.e., Polytetrafluoroethylene (PTFE) and so on. But the excessive addition of the water-repellent 1c to the electrodes 1b increases the electric resistance both in the bulk and on the surface of the electrodes 1b and decreases the gas permeability of the electrodes 1b. The excessive hydrophobicity of the electrodes 1b inhibits the humidification of the solid polymer electrolyte membrane 1a. Furthermore, the water absorbed in the solid polymer electrolyte membrane 1a is taken away by the fuel gas and the oxidizer gas provided to the catalyst layer 1d. Therefore the solid polymer electrolyte membrane 1a is dried out.

In order to improve the efficiency of the catalyst activity by three-dimensionally using the catalyst layer 1d, the electrolyte of the electrolyte membrane 1a has been dissolved with a catalyst in a solvent and impregnated with a gas diffusion layer wherein the gas can be diffused. In this process, the electrodes acquire proton-conductivity and even hydrophilicity. The electrode 1b as a gas diffusion type electrode, i.e., the electrode formed with the gas diffusion layer, needs to easily and equally distribute the fuel gas and oxidizer gas to the surface of the catalyst layer 1d. For this to occur, and to increase the porosity content, the gas permeability and gas diffusion coefficient needs to be increased.

However, the excessive provisions of fuel gas and oxidizer gas causes the electrolyte membrane 1a to be dried out, so that the proton-conductivity of the solid polymer electrolyte membrane 1a is reduced.

In addition, the conventional separators 1e of the fuel cell as shown in FIG. 3 generally are formed with concave portions and convex portions relative to the electrodes, in sectional shape, in order to output electric current and supply the fuel gas and the oxidizer gas to the electrodes 1bb and 1ba, respectively. Since the fuel gas and the oxidizer gas pass through the concave portions of the separators to be provided to the electrodes, but not at the convex portions, the fuel gas and the oxidizer gas are not equally diffused or distributed over the whole surface of each separator 1e. The electrodes 1b (the gas diffusion type electrodes) must diffuse the fuel gas or the oxidizer gas from the concave portions to the convex portions of the surface of the separators in order that the concentration of the fuel gas or the oxidizer gas is equally diffused in the surface of the catalyst layer 1d. For the above function, the electrodes 1b (the gas diffusion type electrodes) are made of a material having a large gas diffusion coefficient (porous material). But, the above material (porous electrode) tends to remove water from the electrolyte membrane 1a, to dry the solid polymer electrolyte membrane 1a.

As described above, it is necessary for the gas diffusion layer of the fuel cell to be made with an appropriate balance between hydrophilicity and hydrophobicity, and an appropriate gas permeability.

To form the electrode having hydrophilicity, hydrophobicity and gas permeability, the conventional electrode is by from the following process. First, carbon black CB and PTFE formed in a paste with a dispersion medium are shaped in a sheet form. Then the sheet is baked to sinter the PTFE. Alternatively, the CB and PTFE are sometimes impregnated with carbon cloth or carbon paper, then the impregnated sheet is baked.

Though the structure or content of the above electrode is decided by a complex agglutination/dispersion mechanism which is changed by types, contents and mixing methods of the carbon blacks CB, PTFEs and dispersion mediums, the internal structure of the electrode cannot be regulated depending on the designer's intent.

SUMMARY OF THE INVENTION

According to an aspect of the present invention, a solid polymer electrolyte fuel cell includes a polymer electrolyte membrane having proton-conductivity, an anode disposed on one surface of the polymer electrolyte membrane, and a cathode disposed on the other surface of the polymer electrolyte membrane. The cathode has a first gas diffusion layer joined to a second gas diffusion layer in the thickness direction of the cathode. The second gas diffusion layer has different characteristics as compared to the first gas diffusion layer.

According to another aspect of the present invention, the cathode has a hydrophilic intermediate layer disposed between the first gas diffusion layer and the second gas diffusion layer of the cathode for holding water. The first gas diffusion layer differs from the second gas diffusion layer in any one of gas permeability in the thickness direction of the cathode, electric resistance and hydrophobicity. The first gas diffusion layer is disposed at a catalyst layer side of the cathode and the second gas diffusion layer is disposed at a separator side of the cathode. The gas permeability of the second gas diffusion layer is larger than the gas permeability of the first gas diffusion layer.

Another aspect of the invention involves a method for producing an electrode of the solid polymer electrolyte fuel cell and includes a first step of forming a plurality of second gas diffusion layers, a second step of forming a first gas diffusion layer by the pressing one of the second gas diffusion layers to increase a density of the second gas diffusion layer, and a third step of thermally pressing to join the first gas diffusion layer to the second gas diffusion layer.

BRIEF DESCRIPTION OF THE DRAWINGS

The foregoing and additional features and characteristics of the present invention will become more apparent from the following detailed description considered with reference to accompanying drawings in which like reference numerals designate like elements and wherein.

DETAILED DESCRIPTION OF THE PREFERRED EMBODIMENT

Hereinafter, an embodiment of the present invention will be described with reference to the attached drawings. Requirements of a cathode of a solid polymer electrolyte fuel cell are resistance to flooding by water in a catalyst and a necessity or a small necessity of humidification of fuel gas and/or oxidizer gas from outside of the fuel cell.

Figure 1:
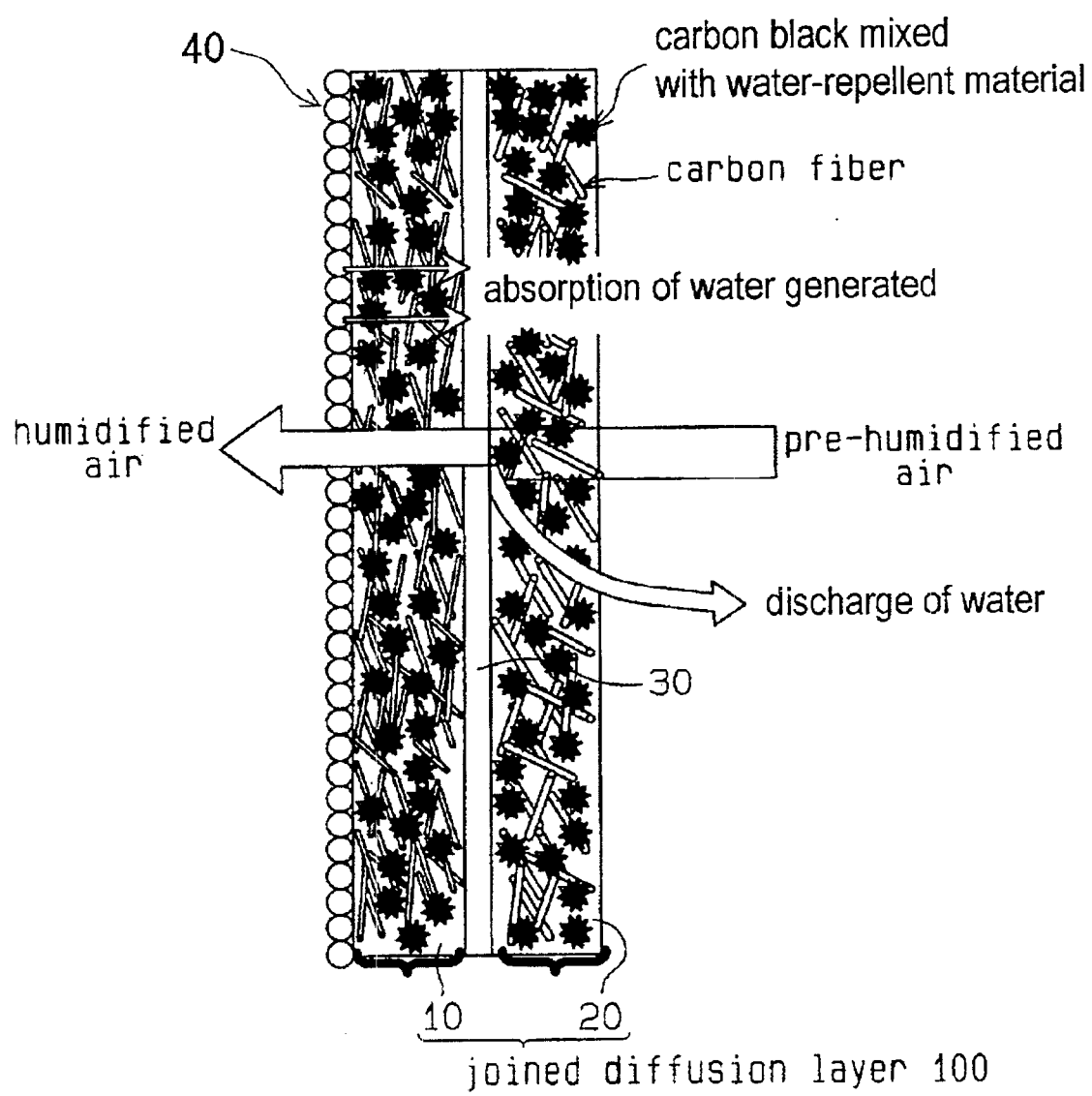
FIG. 1 shows a cross sectional view of a cathode according to the present invention.

FIG. 1 shows a cathode 100 according to the present invention. The cathode (joined diffusion layer) is constructed by disposing a first gas diffusion layer 10 over a second diffusing layer 20, as a multiple layer structure. The cathode 100 includes a first gas diffusion layer 10 disposed at a catalyst layer 40 side and a second gas diffusion layer 20 disposed at a separator (not shown) side. The first gas diffusion layer 10 has small gas permeability compared to the second diffusing layer 20. The first gas diffusion layer 10 is made of a high density or airtight material layer. While the second gas diffusion layer 20 is made of a porous material layer which has larger porosity compared to that of the first gas diffusion layer 10.

The first gas diffusion layer 10 is produced by compressing the second gas diffusion layer 20 in the thickness direction thereof. Thus the first gas diffusion layer 10 will have a higher density compared to the second gas diffusion layer 20.

The cathode 100 is further provided with an intermediate layer 30 disposed between the first gas diffusion layer 10 and the second gas diffusion layer 20 for keeping or holding water. The intermediate layer 30 is made of a hydrophilic material, for example, carbon black CB and so on. The intermediate layer 30 absorbs and holds the water generated by an electrochemical reaction. Therefore the intermediate layer 30 prevents the water flooding the catalyst layer at the cathode side.

When the dried oxidizer gas reaches to the intermediate layer 30, a part of the dried oxidizer gas is diverted to take the water to outside of the cathode 100. While the remaining oxidizer gas passes through the intermediate layer 30 to be humidified, and is provided to the electrolyte membrane. By providing the above two separate passages for the oxidizer gas, the excessive humidification of the oxidizer gas is prevented.

In the cathode 100, the first gas diffusion layer 10 may differ from the second gas diffusion layer 20 in one or more of gas permeability in the thickness direction of the electrode, electrical resistance and hydrophobicity.

In accordance with the present invention, since the plural gas diffusion layers are connected or each other or joined therewith under pressure to form an electrode as described above, the structure of the electrode in the thickness direction (thickness, the characteristics of material and so on) can be readily controlled. By inserting other sheet made of material having different characteristics in water-attraction, water-repellence and so on, the performance of the intermediate layers of the electrode can be separately changed.

As the present invention, joining plural gas diffusion layers which have the same or different characteristics provides following effects.

1. Freedom in designing the electrode is dramatically improved.

2. Since a combination of the gas diffusion layers can be flexibly changed, the specifications of the electrolyte membranes, separators, operating condition, and so on can be flexibly changed, so that a small stock of gas diffusion layers can be used for many types of electrodes. For example, a change of the thickness of the electrode can be provided by changing the number of gas diffusion layers to be joined under pressure.

3. Since the plural gas diffusion layers which have same or different characteristics or sizes can be partially combined or joined, the cross sectional shape of the electrode or partial characteristics of the electrode can be changed.

4. In addition, the electric resistance of the first gas diffusion layer may differ from that of the second gas diffusion layer. In this case, the electric correcting performance of the electrode will be improved.

A. Production of Electrode Example

To produce the electrode shown in FIG. 1, an electrode (example) has been manufactured by the following steps. The gas diffusion layers to be joined are manufactured based on a method for producing a carbon paper disclosed in Japanese Patent Application Publication published on May 5, 2000 as Toku-Kai-Hei 2000-136493. Namely, the gas diffusion layers are formed in a wet papermaking process.

1. Carbon fiber (diameter: $\phi=12.5$ $\mu$m, length: L=3 mm) and wood pulp are prepared in proportion 6 part to 4 in weight. The carbon fiber and the wood pulp are dispersed in water with an appropriate reagent to form a paste. The wood pulp is added as binder (fiber for binding the carbon fiber) to bind the carbon fibers so that the gas diffusion layer can be thin.

2. The carbon fiber and pulp paste are formed to be a carbon/pulp paper (weight: 50 g/m$^2$, thickness: T=0.2 mm) by means of the wet papermaking process by hand.

3. Carbon black CB, ethylene glycol and isopropyl alcohol IPA are mixed to form a paste. The paste is homogeneously impregnated into the carbon fiber/pulp paper using a screen printer. After the above impregnation, the ethylene glycol and isopropyl alcohol are removed from the impregnated carbon fiber/pulp paper by being heated at 85° C. in the atmosphere until the carbon fiber/pulp paper is dried out.

4. The PTFE is impregnated into the carbon fiber/pulp paper by dipping the carbon fiber/pulp paper into PTFE 15 wt % (weight percent) dispersion solution, for example, "Polyflon D1" manufactured by Daikin Industries, Ltd. After the above dipping, the impregnated carbon fiber/pulp paper is baked at 390° C. in the atmosphere for 1 hour, until the PTFE is melted or dissolved and fitted to the carbon fiber paper. By the above baking, the wood pulp is burned to be ash, which is left in the vacancies in the baked carbon fiber/pulp paper. The resulting vacancies form gas communicating pores or vents in the electrode. Hereinafter, the gas diffusion layers manufactured by the above processes will be called the second gas diffusion layers 20.

5. For controlling the gas permeability, the gas diffusion layer 20 is pressed in a press machine (not shown) to increase their densities. Hereinafter, the gas diffusion layer produced by pressing the second gas diffusion layer 20 at room temperature will be called the first gas diffusion layer 10.

6. To form the hydrophilic layer in the intermediate portion of the electrodes in the thickness direction, the carbon black CB is impregnated on only one surface of the second gas diffusion layer 20. (Then the impregnated carbon black CB will be the intermediate layer 30 formed between the first gas diffusion layer 10 and the second gas diffusion layer 20 after the next process.)

7. The above impregnated second gas diffusion layer 20 is joined to the first gas diffusion layer 10 by being pressed or hot-pressed by 80 kg/m$^2$ at 160° C. for 1.5 minutes. Accordingly, the above multiplied gas diffusion layer is a joined diffusion layer 100 of the present invention.

Reference Sample (Conventional Art)

1. As in the example of the present invention, carbon fiber (diameter: φ=12.5 μm, length: L=3 mm) and wood pulp are prepared in proportion 6 part to 4 in weight. The carbon fiber and pulp are dispersed in water with an appropriate reagent and formed in a paste.

2. The carbon fiber and pulp paste are formed to be a carbon/pulp paper (weight: 50 g/m$^2$, thickness: T=0.4 mm).

3. Carbon black CB, ethylene glycol and isopropyl alcohol (IPA) are mixed to be formed in a paste. The paste is equally impregnated into both surfaces of the carbon fiber/pulp paper by a screen printer. After the above impregnation, the ethylene glycol and isopropyl alcohol are removed from the impregnated carbon fiber/pulp paper by heating in 85° C. atmosphere, until the carbon fiber/pulp paper is dried.

4. The PTFE is impregnated into the carbon fiber/pulp paper by dipping the carbon fiber/pulp paper into PTFE 15 wt % (weight percent) dispersion solution, for example, "Polyflon" D1 manufactured by Daikin Industries, Ltd. After the above impregnation, the impregnated carbon fiber/pulp paper is baked at 390° C. in atmosphere for 1 hour, until the PTFE is melted or dissolved and fitted to the carbon fiber paper.

5. The above impregnated carbon fiber/pulp paper is pressed at room temperature to the same thickness as the joined diffusion layer 100. Accordingly the above coldpressed carbon fiber paper is the diffusion layer to be compared as a reference sample.

Method For Producing Membrane-electrode Assembly

To measure the fuel cell electrode of the present invention, a membrane-electrode assembly, which is constructed by joining the solid electrolyte membrane to the electrode, is manufactured by following processes.

1. Platinum supported by carbon black, polymer electrolyte solution (for example, "Aciplex solution", a trademark, manufactured by Asahi Chemical Industry Co., Ltd.), water and isopropyl alcohol are mixed in proportion 1:15:2:2 in weight to form a paste.

2. The above catalyst paste is coated on one surface of the joined diffusion layer 100 at the first gas diffusion layer 10 side to a thickness of 300 mm. The catalyst paste is also coated on one side of the reference diffusion layer to a thickness of 300 mm. Both catalyst pastes are dried at 80° C. in a vacuum.

3. The joined diffusion layer 100 is cut into a circle which has a diameter φ=35.7 and an area S=10 cm$^2$. The reference diffusion layer is cut into three circles which have the same diameter and the same area.

4. The joined diffusion layer 100 and the reference diffusion layers cut into circles are joined with polymer electrolyte membranes (for example, "Nafion 112", a trade mark, manufactured by E.I. du Pont de Nemours and Company) by hot-pressing. Accordingly, a membrane-electrode assembly is formed.

As two combinations of the electrodes, the following two membrane-electrode assemblies are manufactured.

Anode/Cathode=Reference gas diffusion layer/Joined diffusion layer

Anode/Cathode=Reference diffusion layer/Reference diffusion layer

The effects of the present invention are verified in application to the cathode.

B. Characteristic Evaluation

Table 1 shows each thickness, gas permeability and bulk electric resistance of the electrodes.

The joined diffusion layer scarcely differs from the reference diffusion layer in the characteristics (thickness, gas permeability, and bulk electric resistance).

TABLE 1

| | Gas Diffusion Layers Characteristics | | | |
|---|---|---|---|---|
| | Diffusion layer 1 | Diffusion layer 2 | Joined diffusion layer | Reference diffusion layer |
| Thickness [mm] (under pressure at 20 kgf/cm$^2$) | 0.15 | 0.1 | 0.26 | 0.26 |
| Gas permeability co- | 450 | 35 | 32 | 30 |

TABLE 1-continued

Gas Diffusion Layers Characteristics

|  | Diffusion layer 1 | Diffusion layer 2 | Joined diffusion layer | Reference diffusion layer |
|---|---|---|---|---|
| efficient [μm (Pa · s)$^{-1}$] | | | | |
| Electric resistance (under pressure at 20 kgf/cm$^2$) | 18 | 8 | 24 | 23 |

Next, the joined diffusion layer and the reference diffusion layer were disposed at the cathode sides in the actual solid polymer electrolyte fuel cells, respectively. Then the difference in characteristics between the fuel cell with the joined diffusion layer and the fuel cell with the reference diffusion layer was evaluated when the fuel cells were actually operated. In these case, purified hydrogen gas ($H_2$) is employed as the fuel gas, while, air was used as the oxidizer gas. Each gas was humidified by passing the gas through thermally controlled water. Thus each gas included a saturated vapor corresponding to the water temperature and was inducted into the fuel cell. In this evaluation, three temperatures of the water in bubbling at the cathode side were determined, the potential-current characteristic (V-I characteristic) and cell resistance were measured.

Operating conditions of the fuel cell were determined as follows.

Gas Pressure: Purified hydrogen/Air=2 atm/2 atm

Stoichiometrical Ratio: Purified hydrogen/Air=1.2/4

Cell Temperature: 80° C.

Water temperature: Purified hydrogen/Air=90° C./(a) 50° C., (b) 80° C., (c) 30° C.

TABLE 2

Cell Resistance with Respect to Each Gas Diffusion Layer

| Water Temperature | Electric Resistance of Joined Diffusion layer [mΩcm$^2$] | Electric Resistance of Reference Diffusion Layer [mΩcm$^2$] |
|---|---|---|
| (a) 50° C. | 142 | 141 |
| (b) 80° C. | 139 | 137 |
| (c) 30° C. | 144 | 233 |

As shown in Table 2, if either the joined diffusion layer or the reference diffusion layer is employed in the cathode, the difference of the characteristics, i.e., a flooding-resistance and a dry-up-resistance, was verified.

Figure 2:
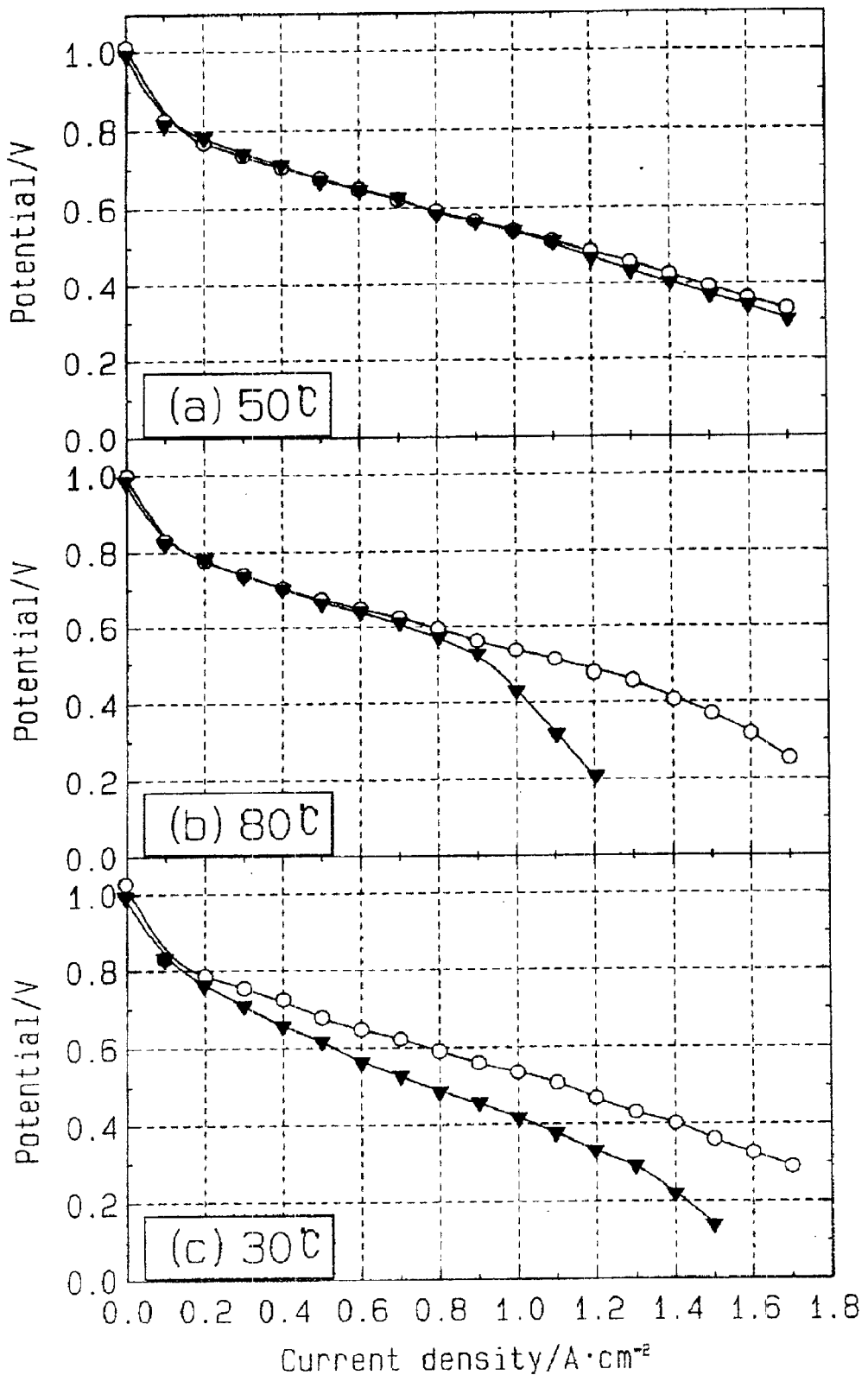
FIG. 2 shows graphs for evaluation of a contacting diffusing layer and a reference diffusing layer.
Figure 3:
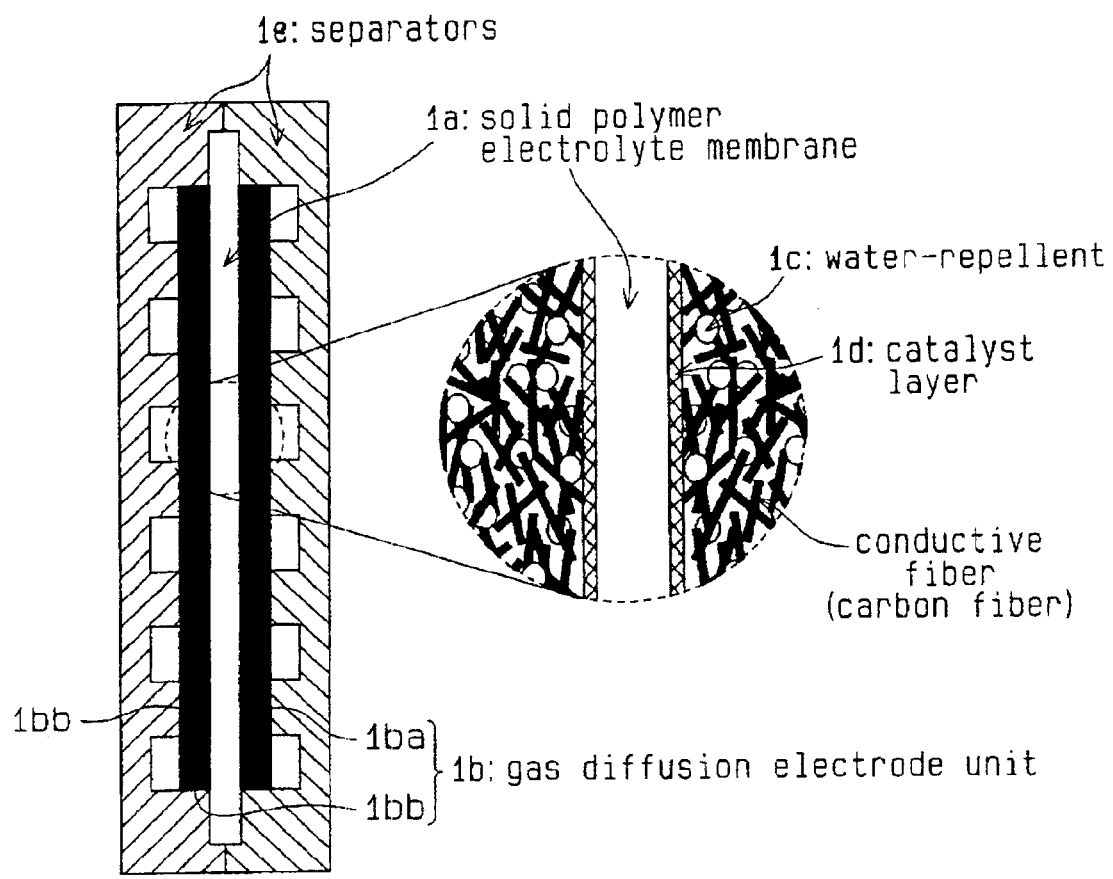
FIG. 3 shows a cross sectional view of a conventional solid polymer electrolyte fuel cell.

FIG. 2 shows the differences in potential-current characteristics (V-I characteristics) between the example and the reference sample relative to the three water temperatures for the humidification for the gases.

FIG. 2-(a) especially shows the difference in the potential-current characteristics of the solid polymer electrolyte fuel cell when the water temperature of the humidification was set at 50° C. Even if any one of the joined diffusion layer and the reference diffusion layer was employed in the fuel cell, the characteristics of the fuel cells scarcely differ from each other.

FIG. 2-(b) shows the difference in the potential-current characteristics when the water temperature of the humidification was set at 80° C. in order that the air was more humid than at 50° C. The characteristic of the cathode disposed with the joined diffusion layer was almost the same as at 50° C. To the contrary, according to the cathode disposed with the reference diffusion layer, the potential rapidly dropped relative to the current density area more than 1 A/cm$^2$. The drop of the potential in the fuel cell disposed with the referential layer was due to the flooding by the generated water in the catalyst layer. The cause of the flooding was assumed to be that the excess water quantity limits the water elimination performance of the reference diffusion layer.

FIG. 2-(c) shows the potential-current characteristics when the water temperature was set at 30° C. in order that the humidification of the air at the cathode side was reduced to a low level. The potential relative to the current density of the joined diffusion layer is indicated by circle stamps (O) in FIG. 2-(c). While, the potential of the reference diffusion layer is indicated by triangle stamps (▼) in FIG. 2-(c). The characteristic of the fuel cell disposed with the joined diffusion layer was almost the same as that of the fuel cell where the gas is humidified at 50° C. The potential of the fuel cell disposed with the reference diffusion layer rapidly dropped relative to the increment of the current density compared to the potential of the fuel cell disposed with the reference diffusion layer. The cause of the rapid drop of potential is assumed to be that the solid polymer electrolyte membrane was dried out by reducing the humid of the gas at the cathode side. The above phenomenon is confirmed by the increment of the cell resistance shown in Table 2 when the fuel cell with the reference diffusion layer was operated.

To the contrary, the potential of the fuel cell disposed with the joined diffusion layer did not drastically drop. Since the air was provided and humidified by the intermediate layer 30, the polymer electrolyte membrane was not dried out. The above phenomenon is confirmed by the fact that the cell resistance in Table 2 was scarcely changed when the fuel cell was disposed with the joined diffusion layer.

As described above, the electrode structured by joining the plural layers provides the following effects. In addition, the gas diffusion layer permits the water generated by the reaction in the catalyst layer to be eliminated to the outside. The gas diffusion layer further humidifies the electrolyte membrane. The electrode made by joining a diffusion layer disposed at the catalyst layer side having hydrophobicity and another diffusion layer disposed at the separator side having hydrophilicity provides the following two effects.

1. The water generated in the catalyst layer can be easily eliminated to the outside of the catalyst layer, owing to the different characteristics of diffusion layers. Therefore the flooding of the water absorbed in the catalyst layer is reduced.

2. The dehydration of the solid polymer electrolyte membrane can be prevented when the cell is under high temperature, which prevents the electrolyte membrane from being dried out.

By joining the gas diffusion layer having the low gas diffusing performance and the other gas diffusion layer having the high gas diffusing performance, the solid polymer electrolyte membrane is not dried out and the gases can be uniformly provided to the whole surface of the catalyst layer.

Furthermore, by coating or laminating material having different characteristic on the marginal surface of the gas diffusion layer, the electrode can have a new function. For example, if a metal mesh is disposed between the gas diffusion layers, then the electric correcting performance of the electrode will be improved.

The specification of electrode of the fuel cell needs to be changed depending on the condition wherein the fuel cell is used. Lately, the fuel cell is mainly intended to use as an energy source in the vehicle and a stationary energy source in a house. For the vehicle, since the fuel cell is highly pressurized and operated in large electric current area, the catalyst layer can be easily flooded. To prevent the flooding, the electrode must have high hydrophobicity.

For the stationary energy source in the house, since the fuel cell is at normal pressure, the electrolyte membrane tends to be dried. To prevent the electrode membrane from being dried, the electrode for home use has a slightly lower hydrophobicity compared to the electrode for the vehicle. In addition, since each of the anode and the cathode has different functions, the various electrodes corresponding to the functions are demanded.

The electrode of the present invention is structured by combining plural gas diffusion layers. Thus the electrode can be formed to meet the designer's demand by preparing the different characteristic gas diffusion layers and combining therewith. For suiting each purpose, the fuel cell need to be formed by various thickness electrodes. The electrode of the present invention can easily satisfy the above demand of thickness.

What is claimed is:

1. A solid polymer electrolyte fuel cell comprising:
   a) a polymer electrolyte membrane having proton-conductivity, and
   b) an anode disposed on one surface of the polymer electrolyte membrane, and
   c) a cathode disposed on another surface of the polymer electrolyte membrane,
   wherein the cathode comprises a first gas diffusion layer disposed at a catalyst layer side of the cathode joined to a second gas diffusion layer in a thickness direction of the cathode, wherein the second gas diffusion layer is disposed at a separator side of the cathode and wherein the gas permeability of the second gas diffusion layer is larger than the gas permeability of the first gas diffusion layer.

2. The solid polymer electrolyte fuel cell according to claim 1, wherein the cathode further comprises a hydrophilic intermediate layer disposed between the first gas diffusion layer and the second gas diffusion layer of the cathode.

3. The solid polymer electrolyte fuel cell according to claim 1, wherein the first gas diffusion layer further differs from the second gas diffusion layer in one of electric resistance and hydrophobicity.

4. The solid polymer electrolyte fuel cell according to claim 1, wherein at least one of the anode and the cathode is made by wet papermaking process.

5. An electrode comprising:
   a first gas diffusion layer disposed at a catalyst layer side of the cathode, and
   a second gas diffusion layer joining the first gas diffusion layer in a thickness direction of the electrode, wherein the second gas diffusion layer is disposed at a separator side of the cathode and wherein the gas permeability of the second gas diffusion layer is larger than the gas permeability of the first gas diffusion layer.

6. The electrode according to claim 5, further comprising a hydrophilic intermediate layer disposed between the first gas diffusion layer and the second gas diffusion layer of the electrode.

7. The electrode according to claim 5, wherein the first gas diffusion layer further differs from the second gas diffusion layer in any one of electric resistance and hydrophobicity.

8. A method for producing an electrode of a solid polymer electrolyte fuel cell comprising the steps of:
   (1) forming a plurality of second gas diffusion layers;
   (2) forming a first gas diffusion layer by pressing one of the second gas diffusion layers to increase a density of the second gas diffusion layer, and
   (3) thermally pressing to join the first gas diffusion layer and the second gas diffusion layer which has not been pressed to increase a density thereof to the density of the first gas diffusion layer.

* * * * *